US008050187B2

(12) United States Patent
Chinnapareddy et al.

(10) Patent No.: US 8,050,187 B2
(45) Date of Patent: Nov. 1, 2011

(54) SYSTEM AND METHOD FOR REAL-TIME AAL2 CHANNEL DETECTION IN UTRAN

(75) Inventors: Srikanth Chinnapareddy, Dallas, TX (US); Sirish Davuluri, Ithaca, NY (US); Balaji Ratakonda, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 825 days.

(21) Appl. No.: 12/056,220

(22) Filed: Mar. 26, 2008

(65) Prior Publication Data

US 2009/0011754 A1    Jan. 8, 2009

Related U.S. Application Data

(60) Provisional application No. 60/909,378, filed on Mar. 30, 2007.

(51) Int. Cl.
*H04W 8/18* (2009.01)
*H04W 12/08* (2009.01)
*H04W 24/00* (2009.01)
*H04W 12/04* (2009.01)

(52) U.S. Cl. ............ 370/252; 370/338; 455/422.1

(58) Field of Classification Search .......... 370/254, 370/301.1, 338, 252, 310.1; 455/411, 432, 455/432.1, 422.1; 713/171
See application file for complete search history.

(56) References Cited

U.S. PATENT DOCUMENTS

| | | | |
|---|---|---|---|
| 7,046,992 B2* | 5/2006 | Wallentin et al. | 455/411 |
| 7,535,848 B2* | 5/2009 | Dong et al. | 370/241 |
| 7,558,234 B2* | 7/2009 | Dommaraju et al. | 370/328 |
| 7,783,299 B2* | 8/2010 | Anderson et al. | 455/456.1 |
| 2003/0147371 A1* | 8/2003 | Choi et al. | 370/341 |
| 2006/0245432 A1* | 11/2006 | Kroboth et al. | 370/395.21 |
| 2006/0262736 A1 | 11/2006 | Dong et al. | |
| 2006/0262742 A1* | 11/2006 | Dommaraju et al. | 370/328 |
| 2006/0268894 A1 | 11/2006 | Brinner | |
| 2007/0066298 A1* | 3/2007 | Hurst | 455/423 |

(Continued)

FOREIGN PATENT DOCUMENTS

EP    1006752 A2 *    6/2000

(Continued)

OTHER PUBLICATIONS

TEKTRONIX, "Rapid Resolution of Trouble Tickets", retrieved from internet: URL: www.tektronix.com, retrieved Nov. 27, 2008, 2003, pp. 1-8.

(Continued)

*Primary Examiner* — Chi Pham
*Assistant Examiner* — Ahmed Elallam
(74) *Attorney, Agent, or Firm* — Michael J. Forgarty, III; Matthew D. Rabdau

(57) ABSTRACT

A system and method for detecting channels in a network using messages passing through the network is provided. An embodiment comprises detecting AAL2 channels communicating between a Node B and an radio network controller and also between two radio network controllers. In the case of communication between a NodeB and a radio network controller, the AAL2 channels are detected by matching pairs of Random Access Channel (RACH) and Forward Access Channel (FACH) associated with a user equipment identity along with a Dedicated Channel (DCH) until the AAL2 channels present between the Node B and the RNC are determined to a desired level of confidence. In the case of communication between two radio network controllers, only the DCH channels need to be detected to completely detect the AAL2 channels.

27 Claims, 6 Drawing Sheets

RACH - FACH detection

U.S. PATENT DOCUMENTS

| | | |
|---|---|---|
| 2007/0099561 A1* | 5/2007 | Voss .............................. 455/12.1 |
| 2007/0161377 A1* | 7/2007 | Kodikara Patabandi et al. ............................ 455/450 |
| 2007/0189236 A1* | 8/2007 | Ranta-aho et al. ............ 370/335 |
| 2007/0207770 A1 | 9/2007 | Ikaheimo |
| 2008/0096555 A1* | 4/2008 | Herrmann .................. 455/435.1 |
| 2008/0123585 A1* | 5/2008 | Granzow et al. .............. 370/320 |
| 2008/0240060 A1* | 10/2008 | Janakiraman et al. ........ 370/338 |
| 2008/0242262 A1* | 10/2008 | Xia et al. ...................... 455/405 |

FOREIGN PATENT DOCUMENTS

| | | | |
|---|---|---|---|
| EP | 1725007 | A1 | 11/2006 |
| EP | 1727315 | A1 | 11/2006 |
| GB | 2436415 | | 9/2007 |
| WO | WO 2005/034551 | A | 4/2005 |
| WO | WO 2005/125246 | A | 12/2005 |

OTHER PUBLICATIONS

TEKTRONIX, "Protocol Analysis in UMTS networks", retrieved from internet: URL: www.tektronix.com, retrieved Nov. 27, 2008, 2003, pp. 1-12.

TEKTRONIX, "UMTS Signaling", retrieved from internet: URL: www.tektronix.com, retrieved Nov. 27, 2008, 2005, pp. 1-12.

TEKTRONIX, "Application paper: Monitoring HSUPA Connections with NSA 1.6", from internet: URL: www.tektronix.com, retrieved Nov. 27, 2008, Dec. 7, 2006, pp. 1-21.

* cited by examiner

FIG. 2

| UMTS PROTOCOL STACK-IUB | | | | | |
|---|---|---|---|---|---|
| RADIO NETWORK CONTROL PLANE | TRANSPORT NETWORK CONTROL PLANE | PS DATA USER PLANE | BROADCAST DATA USER PLANE | CS DATA USER PLANE | CS VOICE USER PLANE |
| MM/SM/CC | | APPLICATION | | APPLICATION | |
| RRC | ALCAP | PDCP | BMC | TAF | AMR CODEC |
| | | | | RLP | |
| RLC | STC | RLC | | | |
| MAC | SSCF-UNI | MAC | | | |
| FP | SSCOP | FP | | | |
| AAL2 | AAL5 | AAL2 | | | |
| ATM | | | | | |

FIG. 2

| UMTS PROTOCOL STACK-IUR | | | | | |
|---|---|---|---|---|---|
| | RADIO NETWORK CONTROL PLANE | TRANSPORT NETWORK CONTROL PLANE | PS DATA USER PLANE | CS DATA USER PLANE | CS VOICE USER PLANE |
| MM/SM/CC | | | APPLICATION | APPLICATION | |
| RRC | RNSAP | ALCAP | PDCP | TAF | AMR CODEC |
| | SCCP | STC | | RLP | |
| RLC | MTP3 B | M3UA | | RLC | |
| MAC | SSCF-NNI | SCTP | | MAC | |
| FP | SSCOP | IP | | FP | |
| AAL2 | AAL5 | AAL5 | | AAL2 | |
| ATM | | | | | |

*FIG.3*

SYSTEM AND METHOD FOR REAL-TIME AAL2 CHANNEL DETECTION IN UTRAN

This application claims the benefit of U.S. Provisional Application No. 60/909,378, filed on Mar. 30, 2007, entitled System and Method for Real-Time AAL2 Channel Detection in UTRAN, which application is hereby incorporated herein by reference.

TECHNICAL FIELD

The present invention relates generally to a system and method for monitoring messages in a wireless communications system, and more particularly to detecting ATM Adaption Layer type 2 (AAL2) channels in a UMTS Terrestrial Radio Access Network (UTRAN).

BACKGROUND

The Universal Mobile Telecommunications System (UMTS) is a third-generation (3G) mobile phone technology standardized first by the European Telecommunications Standards Institute (ETSI) and now by the $3^{rd}$ Generation Partnership Project (3GPP). UMTS carries both circuit switched (CS) and packet switched (PS) traffic using, for example, Wideband Code Division Multiple Access (W-CDMA) as its air interface. The description of the network components and protocols used in UMTS are well known to those of ordinary skill in the art and are available to the public from 3GPP, ETSI, and other sources. The UMTS network architecture consists of three interacting domains: Core Network (CN), UTRAN, and User Equipment (UE).

The Core Network (CN) provides switching and routing for user traffic and provides network management functions. The Core Network architecture is based on the GSM network with General Packet Radio Service (GPRS). The UTRAN provides an air interface to a subscriber's UE, such as handheld phones, wireless laptop computer cards, or other wireless devices. The UMTS user equipment communicates over an air interface to a base station. Base stations in the UTRAN are referred to as Node-Bs. The UE may be attached to either the PS domain, CS domain, or both. A UE may be capable of simultaneously using PS services and CS services. The control equipment for the Node-Bs is called a Radio Network Controller (RNC).

Data transmissions within the UMTS, except for the air interface (Uu), use Asynchronous Transfer Mode (ATM). Accordingly, ATM is used to transmit on the Tu interfaces. The ATM layer multiplexes, demultiplexes, and routes ATM cells, and ensures that their sequence from end to end. An ATM cell, the smallest unit in ATM, contains two address parameters, Virtual Path Identifier (VPI) and Virtual Channel Identifier (VCI). A Virtual Path is the permanent Virtual Connection for exchanging Node B Application Part (NBAP) and Access Link Control Application Protocol (ALCAP) messages between an RNC and a Node B. By permanent virtual connection it is understood that the connection will be setup once and will run until it is changed or deleted by an operation and maintenance (O&M) process. To transmit higher level protocols via ATM, adaptation layers are used. ATM Adaption Layers (AAL) are responsible for the creation and reception of payloads through the lower layers of ATM on behalf of different applications. ATM Adaption Layer type 2 (AAL2) handles circuit-switched connections, while packet connection protocol AAL5 is designed for data delivery. AAL2 has been developed to transport multiple data streams and a Connection Identifier (CID) identifies each stream. Each AAL2 virtual connection is uniquely associated with an ATM Virtual Path Identifier (VPI), ATM Virtual Channel Identifier (VCI), AAL2 Connection Identifier (CID) and ATM port, which corresponds to the port on which the message arrives and may also be referred to herein as a port identification (PortId).

Network operators, including large telecommunications companies, want to be able to manage their networks to provide their customers, including end users, an appropriate level of service and quality. In order to manage these complicated networks, it is useful to first understand the topology of the network. While the topology of the core may be identified and characterized by hand, for example when the system is being created, as the system spreads out from the core the number of connections increases making manual identification impossible, or at least infeasible. Furthermore, even if the hardware topology is know out to the Node Bs, the data being communicated between end users passes through virtual connections. To more fully manage the network and monitor the level of service and the quality of service, it would be desirable to be able to identify the AAL2 virtual connections. As these connections are virtual, they may be created, changed or deleted over time. To manually identify and track these connections would be impossible, or infeasible.

SUMMARY OF THE INVENTION

These and other problems are generally solved or circumvented, and technical advantages are generally achieved, by embodiments of the present invention in which a method and system identify ATM AAL2 channels in a UMTS Terrestrial Radio Access Network (UTRAN) by identifying a Random Access Channel (RACH) and a Forward Access Channel (FACH) associated with a particular call by matching User Equipment (UE) identities associated with the RACH and FACH channels. A pair of dedicated Channels (DCH) are typically associated with a call for transporting control and data messages. The ports associated with the DCH channels are identified by matching the DCH channels to one or more Access Link Control Application Protocol (ALCAP) messages. An AAL2 channel associated with the RACH, FACH and DCH is then identified. Information associated with the AAL2 channels may be stored in a database. The stored information may also be associated with the RACH, FACH or DCH channels.

The UE identity comprises an International Mobile Subscriber Identity (IMSI), a Temporary Mobile Subscriber Identity (TMSI) combined with a Location Area Identity (LAI), or a Packet Temporary Mobile Subscriber Identity (PTMSI) combined with a Routing Area Identity (RAI).

The DCH is matched to the ALCAP messages using a DCH key and an ALCAP key. The ALCAP key comprises a Connection Identifier (CID), an ALCAP session type, and a Virtual Path Identifier (VPI). The ALCAP session type may be determined based upon Node B Application Part (NBAP) messages detected before the ALCAP messages were detected. The DCH key may comprise a CID, a DCH session type that indicates if the DCH channel is for transporting control or data messages, and a VPI. The DCH session type is selected based upon a type of channel carried on the DCH.

In another embodiment, a system and method for correlating access channels associated with a call in a UMTS Terrestrial Radio Access Network (UTRAN) comprises detecting one or more Random Access Channel (RACH) messages and determining a User Equipment (UE) identity for each of the one or more RACH messages. The UE identity that is present in one or more RACH messages may be stored in a database. A Forward Access Channel (FACH) message is detected and a UE identity may be determined for the FACH message. The database may be searched for UE identities that were present in the RACH messages to match with the UE identities that are present in the FACH messages. Pairs of matching UE identities that were present in the RACH and FACH messages may be stored in a database. One or more additional FACH messages may be detected, wherein each of the additional FACH messages have the UE identity. The database may be searched for UE identities that match the UE identities of the additional FACH messages. A number of additional pairs of matching UE and UE identities may also be stored.

The UE identity match is validated by determining how many additional pairs are detected. The UE identity match may be validated when a predetermined number of additional pairs are detected. The predetermined number may be configured by a network operator. The predetermined number may be configured based upon a level of confidence required by a network operator. The RACH and FACH messages may be detected on a Iub interface between a Node B and a Radio Network Controller (RNC).

The UE identity may comprise an International Mobile Subscriber Identity (IMSI), a Temporary Mobile Subscriber Identity (TMSI) combined with a Location Area Identity (LAI), or a Packet Temporary Mobile Subscriber Identity (PTMSI) combined with a Routing Area Identity (RAI).

Another embodiment comprises a system and method for identifying ports used by dedicated channels in a UMTS Terrestrial Radio Access Network (UTRAN). One or more Access Link Control Application Protocol (ALCAP) messages are detected and the ports used to transmit or receive the ALCAP messages are identified. An ALCAP key is created for each of the ALCAP messages. A Dedicated Channel (DCH) message is detected, and a DCH key is created for the DCH message. The ALCAP keys are searched for matches to the DCH key. The ports used to transmit or receive the ALCAP message having an ALCAP key that matches the DCH key are associated with the DCH message.

One or more additional DCH messages having the DCH key may be detected. The ALCAP keys are searched for additional ALCAP keys that match the DCH key. The number of additional pairs of matching ALCAP and DCH keys is tracked. The ports assigned to a DCH are validated based upon how many additional pairs of matching ALCAP and DCH keys are detected.

The ALCAP key comprises a connection identifier, a session type, and a virtual path identifier. The session type may be either data or control. The session type may be determined based upon Node B Application Part messages that were detected before the ALCAP messages. The DCH key comprises a connection identifier, a session type, and a virtual path identifier. The session type may be selected based upon a type of channel carried on the DCH, such as a dedicated control channel or a dedicated traffic channel. The DCH messages may be detected on an Iub interface between a NodeB and a Radio Network Controller or on an Iur interface between two Radio Network Controllers.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 is a protocol stack for an Iub interface;

FIG. 3 is a protocol stack for an Iur interface;

DETAILED DESCRIPTION

Figure 1:
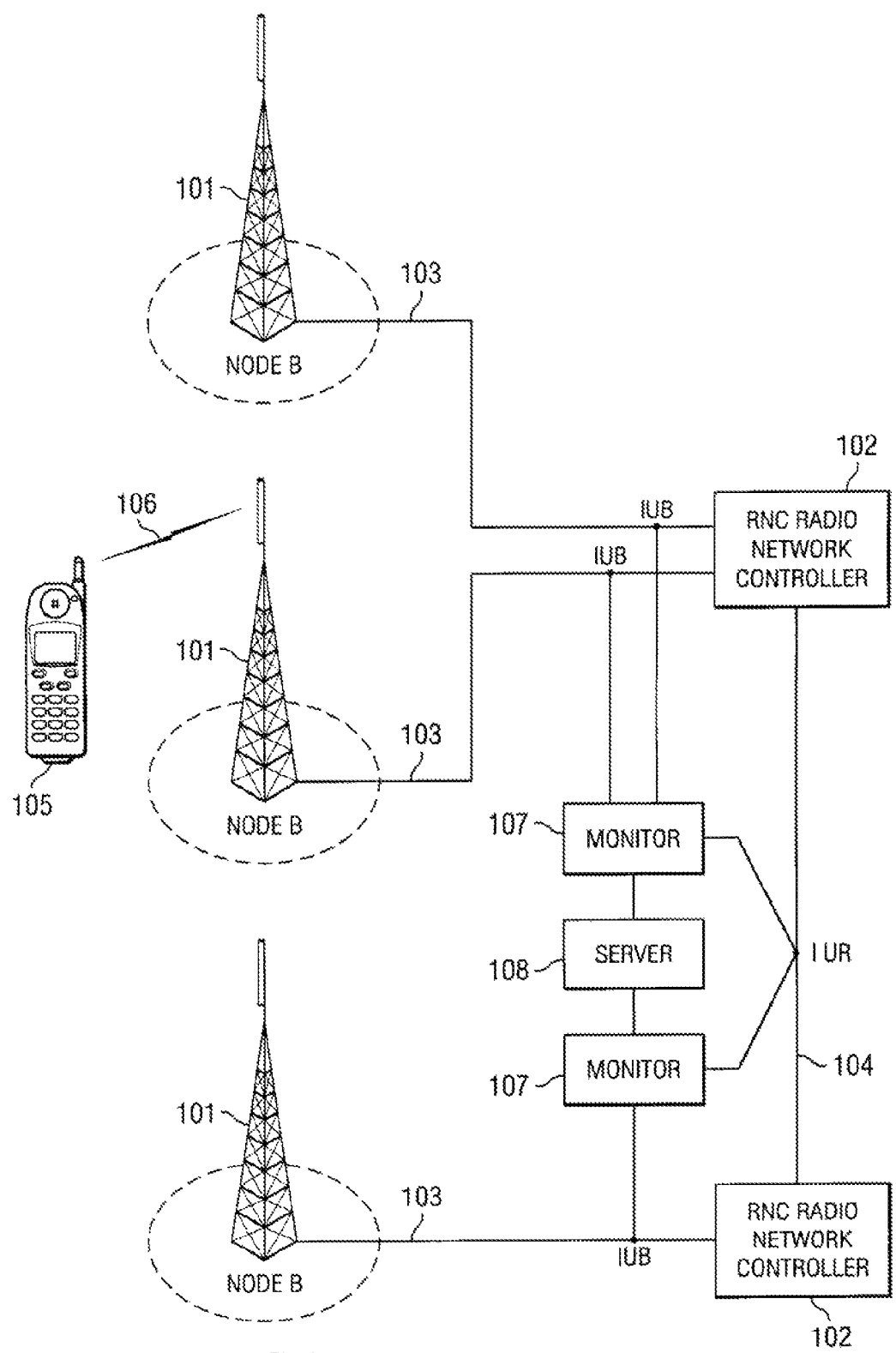
FIG. 1 illustrates monitoring equipment coupled to a UTRAN network according to embodiments of the invention.

FIG. 1 illustrates a UTRAN portion of a UMTS network comprising Node Bs 101 and Radio Network Controllers (RNCs) 102. Node Bs 101 communicate with RNCs 102 via Iub interfaces 103. RNCs 102 communicate with each other via Iur interfaces 104. Node Bs 101 are in communication with User Equipment (UE) 105 via air interface Uu 106. Whenever UEs 105 make or receive a call, signaling messages are exchanged between Node Bs 101 and RNCs 102 over Iub interfaces 103 and between RNCs 102 over Iur interfaces 104. Monitors or probes 107 are non-intrusively coupled to RNCs 102 to capture substantially all of the protocol messages traveling to and from RNCs 102 over the Iub 103 and Iur 104 interfaces. Monitors 107 are coupled to central server 108, which allows an operator to access network information collected by monitors 107.

FIG. 2 illustrates the protocol stack used on the Iub interface of a UTRAN network. FIG. 3 illustrates the protocol stack used on the Iur interface of a UTRAN network. UTRAN implements an ATM infrastructure of the Iub and Iur interfaces. UTRAN uses both AAL2 and AAL5 adaptations on top of the ATM layer. Node B Application Part (NBAP), Access Link Control Application Part (ALCAP) and Radio Network Subsystem Application Part (RNSAP) protocol messages are carried over AAL5 channels. AAL2 is also widely used in wireless applications due to the capability of multiplexing voice packets from different users on a single ATM connection.

The UTRAN may comprise numerous RNCs that are linked to each other. Each RNC may be connected to two hundred Node Bs, for example. AAL2 connections can exist on all of the interfaces between the RNCs and the Node Bs. Accordingly, it is a very complex task to identify all of the AAL2 channels that are in use in a URTAN. Embodiments of the present invention dynamically detect AAL2 channels that are being used to transmit data in the UTRAN.

Before the AAL2 channels can be detected, the Node Bs and their corresponding Iub interfaces are identified. This may be accomplished for example using the systems and methods described in filed U.S. provisional patent application No. 60/909,267, entitled System and Method for Real-Time Iub and Iur Link Detection and AAL5 Channel Detection in UTRAN, filed on Mar. 30, 2007, and pending U.S. patent application Ser. No. 11/754,090, entitled System and Method for Real-Time Iub and Iur Link Detection and AAL5 Channel Detection in UTRAN, filed on May 25, 2007, the disclosures of which are hereby incorporated by reference herein in their entireties.

The different channels that are detected to comprehensively detect AAL2 channels are Random Access Channel (RACH), Forward Access Channel (FACH), and Dedicated Channel (DCH). The RACH and FACH belonging to a particular call are identified and mapped. The RACH and FACH messages can be identified using an initial UE Identity. For example, the UE Identity may correspond to the International Mobile Subscriber Identity (IMSI), which consists of 8 bytes; Temporary Mobile Subscriber Identity (TMSI) plus the Location Area Identity (LAI), which together consist of 14 bytes; or the Packet TMSI (PTMSI) plus the Routing Area Identity (RAI), which together consist of 17 bytes. The LAI may be further a combination of Mobile Country Code (MCC), the Mobile Network Code (MNC), and the Local Area Code (LAC). The RAI is a combination of the LAI and Routing Area Code (RAC).

Figure 4:
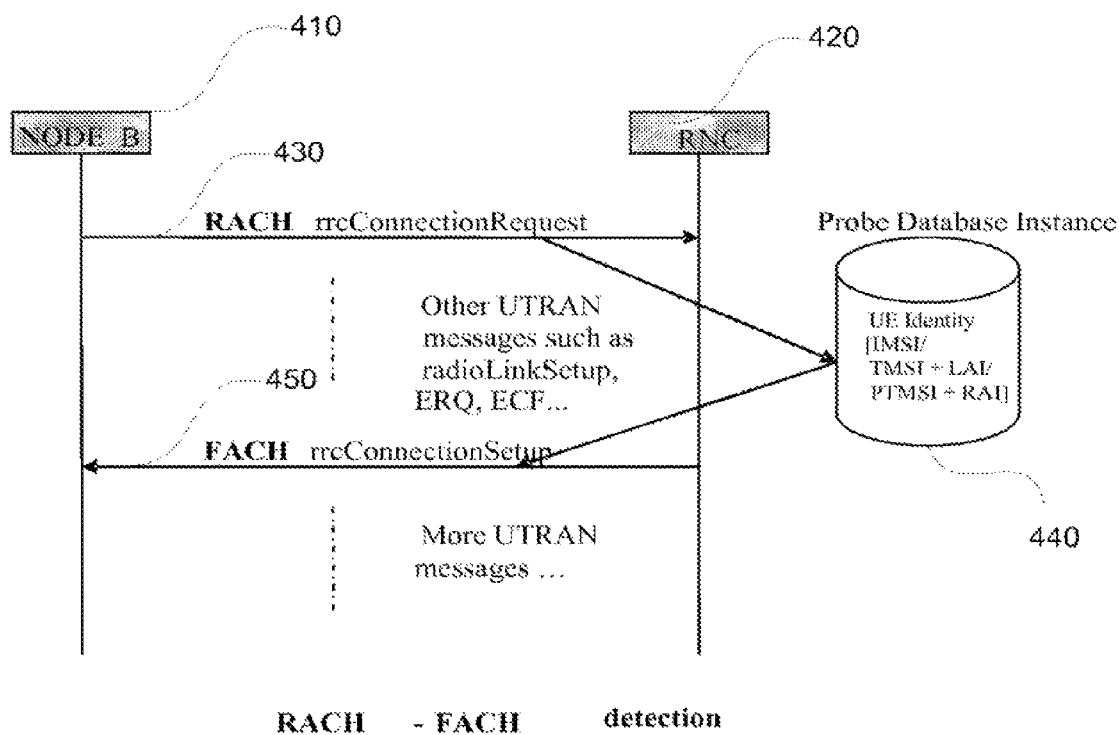
FIG. 4 illustrates matching RACH and FACH pairs according to an aspect of embodiments of the invention.

Referring now to FIG. 4, which illustrates communication between a Node B 410 and an RNC 420. When a RACH message 430 is detected in the network, such as an rrcConnectionRequest message on Iub interface 103 (FIG. 1), for example, the UE Identity is noted and tracked, for example by the Probe Database Instance 440. When a FACH message 450 is seen, such as an rrcConnectionSetup message on Iub 103 (FIG. 1), for example, its UE Identity is extracted and a corresponding RACH message is searched for. When a match is found, a framework for validating the match is initiated. The validating framework employs a check for the same pattern of FACH/UE Identity and matching RACH/UE Identity pairs a number of times. The matching of FACH and RACH pairs is not completely accurate. Accordingly, the match is validated by checking for the pattern a number of times. In one, the default is set to validate the match five times. The number of times may be set to achieve confidence greater than 90%, and in many cases approaching 100%, for example 99.9% would be achievable without checking for the pattern an excessive number of times. The greater the number of times, the greater the level of confidence, as well as the greater amount of time and processing required. In certain embodiments, the number of times the match is repeated is fixed. In other embodiments, the number of times the match is repeated is configurable. In some embodiments, the configuration may be changed by the network operator based upon the desired level of confidence.

A dedicated channel (DCH) can carry either DCCH (Dedicated Control Channel also known as control channel) or DTCH (Dedicated Traffic Channel also known as data channel). DCHs are used to transport user data and control information for a particular UE coming from layers above the physical layer. One challenge in DCH detection is that the "transmit" and "receive" port pair on which the DCH is sent is not known. Not knowing the "transmit" and "receive" port pair makes it difficult to confirm the channel. In embodiments of the present invention, in order to detect the DCH accurately, ALCAP messages are used.

Figure 5:
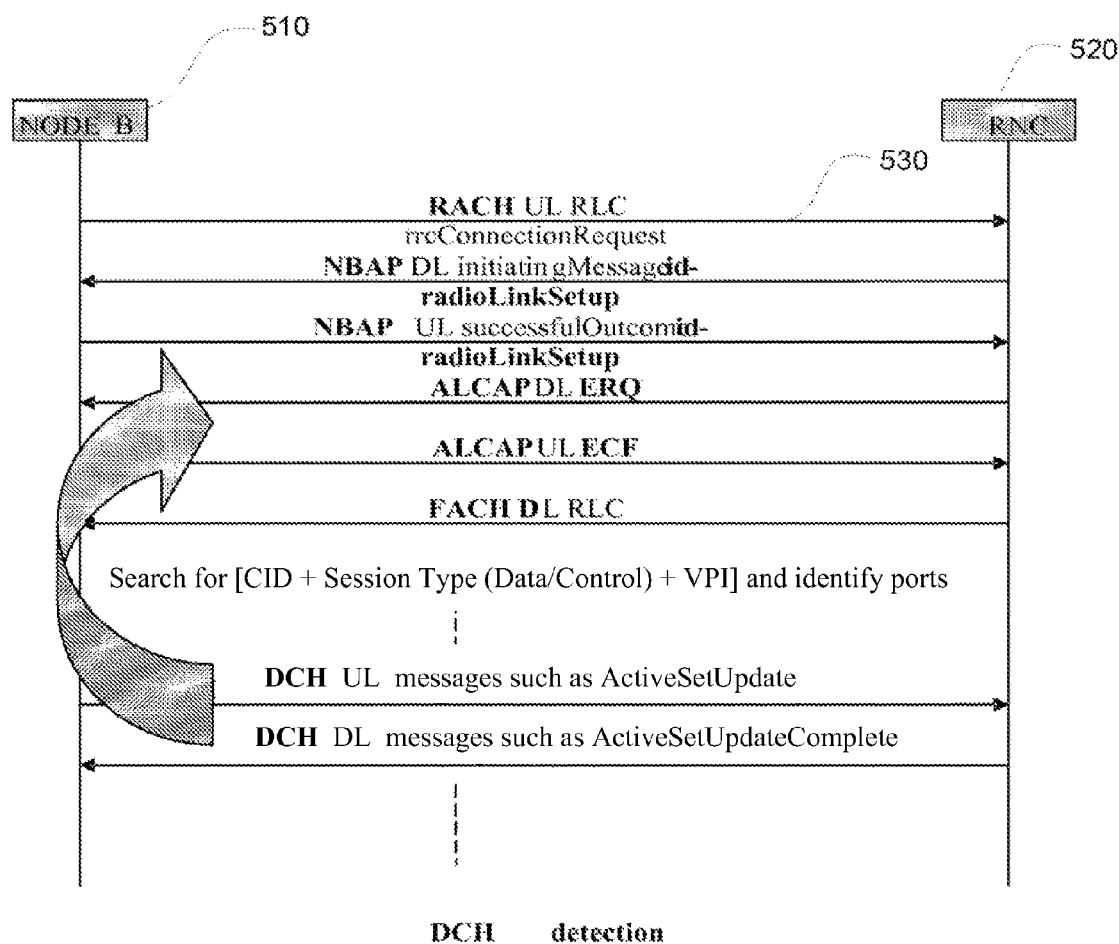
FIG. 5 illustrates determining a DCH between a Node B and an RNC.

FIG. 5 shows part of a call flow scenario between a Node B 510 and an RNC 520. The call flow depicts how ALCAP messages are used to detect DCHs on the Iub between a Node B and an RNC, such as Iub 103 (FIG. 1). The first message 530 is sent on RACH as there is no DCH available yet. The ALCAP protocol sets up the AAL2 Switched Virtual Circuit (SVC) for the DCH. In the next step, radio link setup is used to establish the air interface resources for a DCH that is related to a Node B Communication Context in a Node B. After the UE receives the RRC Connection Setup, it knows which physical resources have been provided for it to use on the radio interface. ALCAP is a transport signaling protocol that is used to set up and tear down transport bearers. Whenever an ALCAP message is seen, the ports on which those messages arrive are identified and tracked using a combination key of CID, Session Type (data or control) and VPI. The session type value is assigned based on the preceding NBAP messages that were received before the ALCAP messages. When a DCH message is detected, the key containing a combination of CID, Session Type and VPI is constructed and the corresponding ALCAP message is searched. The session type is based on the type of channels that DCH is carrying, which is either DCCH or DTCH channels. If a match is found, it indicates that the DCH message arrived on the same ports as the matching ALCAP message. After seeing the same match between the DCH and the ALCAP a number of times, the DCH is confirmed and the server is updated with the new information.

Figure 6:
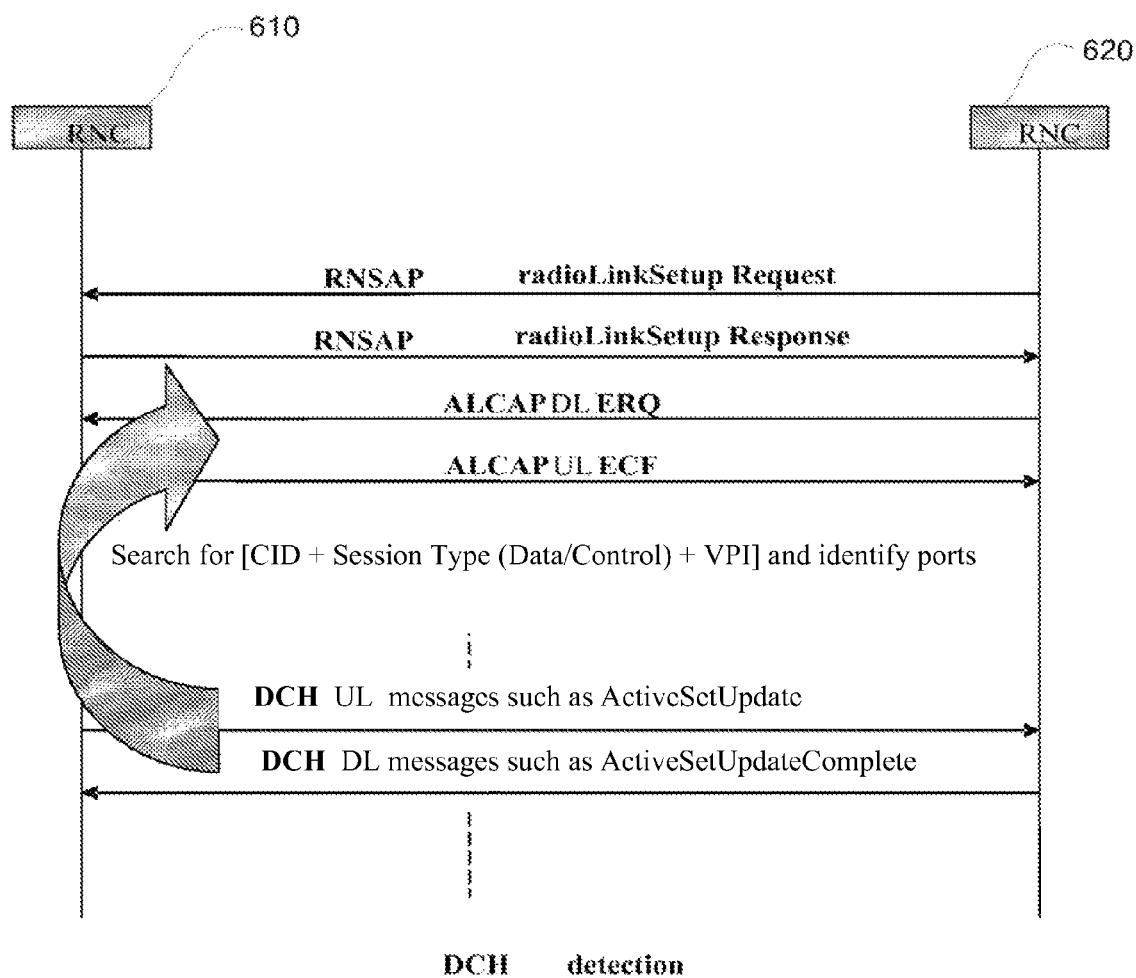
FIG. 6 illustrates determining a DCH between two RNCs.

AAL2 channels are also used for transporting control and data messages on Iur interface which involves communication between two radio network controllers (RNC's). FIG. 6 shows part of a call flow scenario between a first RNC 610 and a second RNC 620. The call flow depicts how ALCAP messages are used to detect DCHs on the Iur connecting two RNCs, such as Iur 104 (FIG. 1). The ALCAP protocol sets up the AAL2 SVC for the DCH. Whenever an ALCAP message is seen, the ports on which those messages arrive are identified and tracked using a combination key of CID, Session Type (data or control) and VPI. When a DCH message is detected, the key containing a combination of CID, Session Type and VPI is constructed and the corresponding ALCAP message is searched. The session type is based on the type of channels that DCH is carrying, which is either DCCH or DTCH channels. If a match is found, it indicates that the DCH message arrived on the same ports as the matching ALCAP message. After seeing the same match between the DCH and the ALCAP a number of times, the DCH is confirmed and the server is updated with the new information.

Once the RACH, the FACH and the DCH have been identified to a desired level of confidence, the AAL2 channels for that particular RNC has been detected at the desired level of confidence.

The information on the AAL2 channels detected in this way can be included in an overall network topology. The topology included the AAL2 channels may be displayed to a user, for example on a workstation using a Graphical User Interface. The more complete the network topology, the more effectively the network operators can measure and manage aspects of the network, as well as the network overall, to provide the level and quality of service that their customers and end-users need to satisfactorily make wireless telephone calls, or utilize other aspects of the wireless network.

Although embodiments of the present invention have been described in detail, it should be understood that various changes, substitutions, and alterations can be made without departing from the spirit and scope of the invention. Moreover, the scope of the present application is not intended to be limited to the particular embodiments described in this specification. As one of ordinary skill in the art will readily appreciate from this disclosure alternative embodiments that perform substantially the same function or achieve substantially the same result as the embodiments described herein.

What is claimed is:

1. A method for correlating access channels associated with a call in a UMTS Terrestrial Radio Access Network (UTRAN), comprising:
   detecting one or more Random Access Channel (RACH) messages;
   determining a User Equipment (UE) identity for each of the one or more RACH messages;
   storing the UE identity for the one or more RACH messages in a database;
   detecting a Forward Access Channel (FACH) message;
   determining a UE identity for the FACH message;
   searching the database for UE identity that was present in the RACH messages to match the UE identity that was present in the FACH message;
   storing information associated with the matched UE identities in a database;
   detecting one or more additional FACH messages, each of the additional FACH messages having the UE identity;

searching the database for UE identities that match the UE identities of the additional FACH messages; and storing a number of additional pairs of matching UEs that are present in the FACH and RACH messages.

2. The method of claim 1, further comprising:

validating a UE identity match by determining how many additional pairs are detected.

3. The method of claim 2, further comprising:

validating the UE identity match when a predetermined number of additional pairs are detected.

4. The method of claim 3, further comprising:

configuring the predetermined number by a network operator.

5. The method of claim 3, further comprising:

configuring the predetermined number based upon a level of confidence required by a network operator.

6. The method of claim 1, further comprising:

detecting the RACH and FACH messages on a Iub interface between a Node B and a Radio Network Controller (RNC).

7. The method of claim 1, wherein the UE identity comprises an International Mobile Subscriber Identity (IMSI).

8. The method of claim 1, wherein the UE identity comprises a Temporary Mobile Subscriber Identity (TMSI) combined with a Location Area Identity (LAI).

9. The method of claim 1, wherein the UE identity comprises a Packet Temporary Mobile Subscriber Identity (PTMSI) combined with a Routing Area Identity (RAI).

10. A non-transitory computer-readable storage medium comprising instructions for correlating access channels associated with a call in a UMTS Terrestrial Radio Access Network (UTRAN), wherein the instructions, when executed, cause a processor to perform actions comprising:

detecting one or more Random Access Channel (RACH) messages;

determining a User Equipment (UE) identity for each of the one or more RACH messages;

storing the UE identity for the one or more RACH messages in a database;

detecting a Forward Access Channel (FACH) message;

determining a UE identity for the FACH message;

searching the database for UE identity that was present in the RACH messages to match the UE identity that was present in the FACH message;

storing information associated with the matched UE identities in a database;

detecting one or more additional FACH messages, each of the additional FACH messages having the UE identity;

searching the database for UE identities that match the UE identities of the additional FACH messages; and storing a number of additional pairs of matching UEs that are present in the FACH and RACH messages.

11. The computer-readable storage medium of claim 10, wherein the instructions, when executed, cause a processor to perform actions further comprising:

validating a UE identity match by determining how many additional pairs are detected.

12. The computer-readable storage medium of claim 11, wherein the instructions, when executed, cause a processor to perform actions further comprising:

validating the UE identity match when a predetermined number of additional pairs are detected.

13. The computer-readable storage medium of claim 12, wherein the instructions, when executed, cause a processor to perform actions further comprising:

configuring the predetermined number by a network operator.

14. The computer-readable storage medium of claim 12, wherein the instructions, when executed, cause a processor to perform actions further comprising:

configuring the predetermined number based upon a level of confidence required by a network operator.

15. The computer-readable storage medium of claim 10, wherein the instructions, when executed, cause a processor to perform actions further comprising:

detecting the RACH and FACH messages on a Iub interface between a Node B and a Radio Network Controller (RNC).

16. The computer-readable storage medium of claim 10, wherein the UE identity comprises an International Mobile Subscriber Identity (IMSI).

17. The computer-readable storage medium of claim 10, wherein the UE identity comprises a Temporary Mobile Subscriber Identity (TMSI) combined with a Location Area Identity (LAI).

18. The computer-readable storage medium of claim 10, wherein the UE identity comprises a Packet Temporary Mobile Subscriber Identity (PTMSI) combined with a Routing Area Identity (RAI).

19. A network monitoring system comprising:

one or more passive monitoring probes coupled to network interfaces, the probes capable of capturing data packets from the network interfaces; and a processor receiving the captured data packets from the probes, the processor operating to:

detect one or more Random Access Channel (RACH) messages;

determine a User Equipment (UE) identity for each of the one or more RACH messages;

store the UE identity for the one or more RACH messages in a database;

detect a Forward Access Channel (FACH) message;

determine a UE identity for the FACH message;

search the database for UE identity that was present in the RACH messages to match the UE identity that was present in the FACH message;

store information associated with the matched UE identities in a database;

detect one or more additional FACH messages, each of the additional FACH messages having the UE identity;

search the database for UE identities that match the UE identities of the additional FACH messages; and store a number of additional pairs of matching UEs that are present in the FACH and RACH messages.

20. The monitoring system of claim 19, wherein the processor is further operable to:

validate a UE identity match by determining how many additional pairs are detected.

21. The monitoring system of claim 20, wherein the processor is further operable to:

validate the UE identity match when a predetermined number of additional pairs are detected.

22. The monitoring system of claim 21, wherein the processor is further operable to:

configure the predetermined number by a network operator.

23. The monitoring system of claim 21, wherein the processor is further operable to:

configure the predetermined number based upon a level of confidence required by a network operator.

24. The monitoring system of claim 19, wherein the processor is further operable to:

detect the RACH and FACH messages on a Iub interface between a Node B and a Radio Network Controller (RNC).

25. The monitoring system of claim 19, wherein the UE identity comprises an International Mobile Subscriber Identity (IMSI).

26. The monitoring system of claim 19, wherein the UE identity comprises a Temporary Mobile Subscriber Identity (TMSI) combined with a Location Area Identity (LAI).

27. The monitoring system of claim 19, wherein the UE identity comprises a Packet Temporary Mobile Subscriber Identity (PTMSI) combined with a Routing Area Identity (RAI).

\* \* \* \* \*